United States Patent Office

3,057,856
Patented Oct. 9, 1962

3,057,856
NICOTINIC ACID ESTERS AND THEIR PREPARATION
Konrad Lothar Zirm and Helmut Weichsel, Steiermark, Austria, assignors to Lannacher Heilmittel Gesellschaft m.b.H., Steiermark, Austria
No Drawing. Filed Dec. 2, 1960, Ser. No. 73,219
Claims priority, application Austria Feb. 19, 1960
4 Claims. (Cl. 260—239.5)

This invention relates to new nicotinic acid esters and more particularly to nicotinic acid esters of steroids containing one or two hydroxyl groups in view of their special pharmacological properties represent valuable medicines and their preparation.

According to the present invention there is provided a method of preparing an ester of a steroid, wherein a steroid containing one or two hydroxyl groups is esterified with nicotinic acid, or a functional derivative thereof.

The steroid may be esterified with nicotinic acid itself, or with a functional derivative thereof, such as nicotinic acid anhydride or a nicotinic acid halide, the latter preferably in the form of the acid hydrohalide salts, such as nicotinic acid chloride hydrochloride. In the latter case esterification is performed in the presence of an acid-binding agent, such as a tertiary base, for instance, pyridine, quinoline, dimethyl aniline, or the like. Esterification with nicotinic acid is preferably performed in the presence of a dehydrating agent, such as phosphorus oxychloride, and of an acid-binding agent, such as a tertiary base, for instance pyridine, quinoline, dimethyl aniline, or the like. When using nicotinic acid anhydride the reaction is preferably performed in the presence of an inert solvent, such as an alkyl benzene, a halobenzene, chloroform, trichlorethylene, benzene, or the like.

Appropriate starting materials are steroids containing one or two hydroxyl groups, such as testosterone, oestrone, oestradiol, or the like.

The nicotinic acid esters obtainable by the present method such as testosterone-17-nicotinic acid ester, oestrone-3-nicotinic acid ester and oestradiol-3,17-bis-nicotinic acid ester excel by their high compatibility whether parenterally or perorally administered as well as by their lasting effect. Being esterified with nicotinic acid their therapeutic administration in doses exceeding normal quantities is not at all objectionable because the organism readily excretes these substances in the usual manner by methylation at the cyclic nitrogen of the nicotinic acid ester. It is also a characteristic of the novel compounds that they have a significant "depot" effect when intramuscularly administered, a property which is of considerable value in the therapy of chronic diseases within the indicated range.

The invention will now be illustrated by the following examples.

EXAMPLE 1

*Testosterone-17-Nicotinic Acid Ester*

14 parts by weight of nicotinic acid anhydride are heated in a bath to 140° C. and 15 parts by weight of testosterone are then added. This mixture is kept at the stated temperature for 30 mins. and frequently stirred. After having cooled, the melt is crushed, taken up in 500 parts by volume of water, and the nicotinic acid which has formed as well as the surplus nicotinic acid anhydride are dissolved by an addition of bicarbonate of soda. 13.7 parts by weight of the reaction product are obtained in crystal form. By recrystallisation from acetone the testosterone-17-nicotinic acid ester is obtained in pure form; melting point=187–188° C. The compound is soluble in dilute hydrochloric and other dilute mineral acids.

EXAMPLE 2

*Testosterone-17-Nicotinic Acid Ester*

50 parts by weight of nicotinic acid chloride hydrochloride are introduced into 200 parts by volume of anhydrous pyridine. 70 parts by weight of testosterone are then added whilst the mixture is being stirred. Stirring is continued for one hour on a steam bath, the solution assuming a reddish-yellow colour. After having been cooled this is poured into 2000 parts by volume of water and the reaction product is precipitated by the introduction of bicarbonate of soda, collected on a filter, washed with water, and finally dried. The yield of testosterone-17-nicotinic acid ester is 66.5 parts by weight. After recrystallisation from acetone the compound melts at 187–188° C. and proves to be identical with that obtained in Example 1.

EXAMPLE 3

*Oestrone-3-Nicotinic Acid Ester*

80 parts by weight of nicotinic acid anhydride are melted at a temperature of 130 to 140° C., 50 parts by weight of oestrone being introduced portionwise into the melt whilst the latter is being stirred. At the end of a reaction period of 30 mins. the melt is allowed to cool and then crushed. This is taken up in 5000 parts by volume of water. The addition of bicarbonate of soda causes the reaction product to precipitate. This is filtered off, washed with water, and dried. Yield: 51.5 parts by weight. By recrystallisation from acetone the oestrone-3-nicotinic acid ester is obtained in pure form, melting point=198–200° C.

EXAMPLE 4

*Oestradiol-3,17-Bis-Nicotinic Acid Ester*

150 parts by weight of nicotinic acid anhydrate are melted on a bath and, at a temperature of 125–150° C., preferably between 140 and 150° C., 50 parts by weight of oestradiol are introduced portionwise whilst the melt is being stirred. At the end of a reaction period of half an hour the resultant viscous melt is dissolved in 1000 parts by volume of acetone. 3000 parts by volume of water are then added, whilst stirring is continued and eventually bicarbonate of soda is introduced. The reaction product which is obtained in a crystalline form is allowed to stand for several hours and then collected on a filter, washed with water, and finally dried. The yield is 65 parts by weight. The resultant oestradiol-3,17-bis-nicotinic acid ester can be purified by recrystallisation from an aqueous, approximately 30% acetone. It is soluble in dilute mineral acids under heat; melting point=150 to 152° C.

EXAMPLE 5

*Oestrone-3-Nicotinic Acid Ester*

5 parts by weight of oestrone are mixed with 10 parts by weight of nicotinic acid, 40 parts by volume of anhydrous pyridine being added to the mixture. Whilst this is being water-cooled, 2 parts by volume of phosphorus oxychloride are added dropwise, the mixture being stirred. A clear solution first forms but this solidifies in crystalline form in the course of a few minutes. The product is allowed to stand at room temperature for an hour and then taken up in 400 parts by volume of water. It is neutralised with bicarbonate of soda and the precipitated crystals are collected on a filter, thoroughly washed with water, and dried. Yield: 6.1 parts by weight of oestrone-3-nicotinic acid ester; melting point=198–200° C. This compound is identical with that obtained in Example 3.

We claim:
1. The new nicotinic acid esters of steroids selected from the group consisting of testosterone-17-nicotinic acid ester, oestrone-3-nicotinic acid ester and oestradiol-3-,17-bis-nicotinic acid ester.
2. The new testosterone-17-nicotinic acid ester having a melting point of 187–188° C.
3. The new oestrone-3-nicotinic acid ester having a melting point of 198–200° C.
4. The new oestradiol-3,17-bis-nicotinic acid ester having a melting point of 150–152° C.

References Cited in the file of this patent

UNITED STATES PATENTS

| 2,586,438 | Rosenberg | Feb. 19, 1952 |
| 2,885,413 | Hogg et al. | May 5, 1959 |
| 2,929,763 | Wettstein et al. | Mar. 22, 1960 |

OTHER REFERENCES

Fieser et al.: Steroids, 1959, pp. 445 and 603, Reinhold Publishing Company, N.Y.

Loewenthal: Tetrahedron, vol. 6, No. 4, pp, 229–302.